United States Patent
Kim et al.

(10) Patent No.: US 10,066,736 B2
(45) Date of Patent: Sep. 4, 2018

(54) SHIFT LEVER APPARATUS AND CONTROL METHOD THEREOF

(71) Applicant: Hyundai Motor Company, Seoul (KR)

(72) Inventors: Yong Hee Kim, Seoul (KR); Myung Lyul Na, Gyeonggi-Do (KR); Min Keun Kwon, Gyeonggi-Do (KR)

(73) Assignee: Hyundai Motor Company, Seoul (KR)

(*) Notice: Subject to any disclaimer, the term of this patent is extended or adjusted under 35 U.S.C. 154(b) by 216 days.

(21) Appl. No.: 14/948,016

(22) Filed: Nov. 20, 2015

(65) Prior Publication Data
US 2017/0023132 A1 Jan. 26, 2017

(30) Foreign Application Priority Data
Jul. 23, 2015 (KR) .................. 10-2015-0104567

(51) Int. Cl.
*B60K 20/00* (2006.01)
*G05G 5/00* (2006.01)
*F16H 59/04* (2006.01)
*F16H 61/18* (2006.01)
*F16H 59/02* (2006.01)

(52) U.S. Cl.
CPC ............. *F16H 59/04* (2013.01); *F16H 61/18* (2013.01); *F16H 2059/026* (2013.01); *F16H 2059/048* (2013.01)

(58) Field of Classification Search
CPC .... F16H 61/18; F16H 2059/026; F16H 59/04; F16H 2059/048
See application file for complete search history.

(56) References Cited

U.S. PATENT DOCUMENTS

| 4,084,448 | A | * | 4/1978 | Wolfe | F16H 59/04 74/10.15 |
| 4,267,744 | A | * | 5/1981 | Yamasaki | B62M 25/04 474/82 |
| 4,631,984 | A | * | 12/1986 | Jones | F16H 59/04 74/473.12 |
| 4,966,262 | A | * | 10/1990 | Mieczkowski | F16H 59/10 192/220.2 |
| 6,415,677 | B1 | * | 7/2002 | Skogward | F16H 59/0217 324/117 H |

(Continued)

FOREIGN PATENT DOCUMENTS

| CN | 101603591 A | 12/2009 |
| JP | H10-297300 A | 11/1998 |

(Continued)

*Primary Examiner* — Jake Cook
(74) *Attorney, Agent, or Firm* — Mintz Levin Cohn Ferris Glovsky and Popeo, P.C.; Peter F. Corless

(57) ABSTRACT

A shift lever apparatus is provided and includes an operating part having fastening pins extracted therefrom and inserted thereinto, based on a signal input. A select lever part is coupled to a shift lever that rotates based on a shift pattern to rotate along with the shift lever. Additionally, the shift lever corresponds to a position of a shift stage based on the shift pattern and includes a plurality of insertion apertures into which the fastening pins are inserted. The fastening pins selectively permit or limit the rotation of the shift lever based on whether the fastening pins are inserted into the plurality of insertion apertures.

14 Claims, 15 Drawing Sheets

(56) References Cited

U.S. PATENT DOCUMENTS

| | | | |
|---|---|---|---|
| 6,431,339 B1* | 8/2002 | Beattie | F16H 59/0204 |
| | | | 192/220.4 |
| 9,816,606 B1* | 11/2017 | Meredith | F16H 59/04 |
| 2004/0031660 A1 | 2/2004 | Kliemannel | |
| 2010/0212447 A1* | 8/2010 | Giefer | B60R 25/066 |
| | | | 74/473.11 |
| 2012/0006139 A1* | 1/2012 | Kim | F16H 59/0217 |
| | | | 74/473.3 |

FOREIGN PATENT DOCUMENTS

| | | |
|---|---|---|
| JP | H11-301296 A | 11/1999 |
| JP | 2001-206094 A | 7/2001 |
| JP | 2008-080908 A | 4/2008 |
| KR | 10-1998-0047235 | 9/1998 |
| KR | 10-2004-0052417 A | 6/2004 |

\* cited by examiner

SHIFT LEVER APPARATUS AND CONTROL METHOD THEREOF

CROSS REFERENCE TO RELATED APPLICATION

The present application claims priority to Korean Patent Application No. 10-2015-0104567, filed on Jul. 23, 2015, the entire contents of which is incorporated herein for all purposes by this reference.

BACKGROUND

1. Technical Field

The present invention relates to a shift lever apparatus capable of preventing a malfunction based on an operation of a shift lever, in a passive transmission vehicle.

2. Description of the Related Art

Generally, a manual transmission is installed between a clutch and a propeller shaft to appropriately shift a driving force of an engine based on a driving state of a vehicle. Further, a transmission lever is installed within the vehicle provided with a passive transmission to enable a driver to perform a shifting operation. The manual transmission has a structure in which the shift lever installed in the interior of the vehicle and the shifting operation mechanism installed at the transmission are connected to each other by cables. As the driver operates the transmission lever, the manual transmission operates a shift cable and a select cable, respectively, to operate the shifting operation mechanism, thereby performing the shifting operation.

However, as illustrated in FIG. 1, the existing manual transmission is configured to perform shifting from a first stage 10 and a second stage 20 to a third stage 30 and a fourth stage 40 and then to a fifth stage 50 and a sixth stage 60 when the shifting operation mechanism is operated. For example, a select operation of direct shifting from the first stage 10 and the second stage 20 to the fifth stage 50 and the sixth 60 stage without passing through the third stage 30 and the fourth stage 40 may occur due to an excessive select operation.

In particular, when unreasonable shifting from a low speed stage to a high speed stage occurs due to the excessive operation of the shift lever, a shifting malfunction may occur that inhibits the transmission from performing the shifting internally. For example, when the shifting suddenly occurs, a rapid increase in an engine revolutions per minute (RPM) and a rapid decrease in a vehicle speed may occur and safety of passengers may be compromised.

The contents described as the related art have been provided merely for enhancement of the understanding for the background of the invention and therefore it may contain information that does not form the prior art that is already known in this country to a person of ordinary skill in the art.

SUMMARY

The present invention provides a shift lever apparatus and control method thereof that sequentially performs shifting for a driver to stably operate a shift stage and prevents excessive shifting from a low speed stage to a high speed stage in a manual transmission.

An exemplary embodiment provides a shift lever apparatus, that may include an operating part having fastening pins extracted (e.g., drawn out) therefrom and inserted (e.g., drawn in) thereinto, based on a signal input, and a select lever part coupled to a shift lever that rotates based on a shift pattern along with the shift lever. Further, the select lever part may correspond to a position of a shift stage that depends on the shift pattern and may include a plurality of insertion apertures. The fastening pins may be inserted into the insertion apertures and may selectively permit or limit the rotation of the shift lever based on whether the fastening pins are inserted into the plurality of insertion apertures.

In some exemplary embodiments, the insertion aperture of the select lever part may include a first aperture that corresponds to a select (e.g., predetermined) position of a reverse stage (R stage), a second aperture that corresponds to a select (e.g., predetermined) position of a low speed stage among advance stages. Further a third aperture may correspond to a select (e.g., predetermined) position of an intermediate speed stage, and a fourth aperture may correspond to a select (e.g., predetermined) position of a high speed stage. In other exemplary embodiments, the third aperture may extend to connect between (e.g., contact or be coupled to) the select position of the low speed stage and the select position of the intermediate speed stage and the fourth aperture may extend to connect between (e.g., contact or be coupled to) the select position of the intermediate speed stage and the select position of the high speed stage. [Please provide exemplary ranges for the different speed stages.]

The second aperture and the fourth aperture may be formed on a concentric circle that may have the same radius based on a rotating center of the select lever part. The third aperture may be formed on a concentric circle that may have a different radius from a position at which the second aperture and the fourth aperture are formed. The first aperture may be formed on either the concentric circle on which the second aperture and the fourth aperture are positioned. Alternatively, the first aperture may be formed on the concentric circle at a position of the third aperture.

In other exemplary embodiments, the first aperture may be formed to correspond to a select position of an R stage and the second aperture may be formed to correspond to select positions of a first stage and a second stage. Further, the third aperture may extend to connect between the select positions of the first stage and the second stage and select positions of a third stage and a fourth stage. The fourth aperture may extend to connect between the select positions of the third stage and the fourth stage and select positions of a fifth stage and a sixth stage. In some exemplary embodiments, the fastening pin of the operating part may include a first pin that may be selectively inserted into the second aperture and the fourth aperture. Additionally, a second pin may be selectively inserted into the third aperture and either the first pin or the second pin may be selectively inserted into the first aperture.

In another aspect, the shift lever apparatus may further include a controller that may be configured to receive driving information of a vehicle and execute the extraction (e.g., drawing out) operation of the fastening pin. The controller may be configured to adjust the extraction operation of the fastening pin based on the driving conditions when the shift lever rotates to be shifted to alternative shift stages and may selectively permit or limit the rotation of the shift lever. The controller may further be configured to extract (e.g., draw out or remove) the first pin or the second pin of the operating part inserted into the first aperture when the shift lever engages the R stage when positioned at the select position of the R stage.

The controller may be configured extract the first pin of the fastening pin inserted into the second aperture when the shift lever engages the first stage in the state when positioned at the select positions of the first stage and the second stage which are the low speed stage. The controller may further be configured to extract the second pin of the fastening pin inserted into the third aperture when the shift lever is shifted to the second stage. The controller may be further configured to monitor (e.g., check) whether the driving stage of the vehicle is within the pre-stored second stage driving range. Additionally, the first pin of the fastening separated from the second aperture may be inserted when the driving state of the vehicle exceeds the second stage driving range.

Additionally, the controller may be configured to monitor (e.g., check) whether the driving state of the vehicle preforms within the pre-stored third stage driving range when the shift lever engages the third stage. The third stage and fourth stage positions are the intermediate speed stages and may extract the second pin of the fastening pin inserted into the third aperture when the driving state of the vehicle does not reach the third stage driving state. The driving state of the vehicle may be within the third stage driving range or may exceed the third stage driving range and the controller may be configured to extract the first pin of the fastening pin inserted into the fourth aperture or maintain the inserted state of the first pin.

When the shift lever is shifted to the fourth stage and the controller may be configured to insert the first pin of the fastening pin into the fourth aperture and insert the second pin into the third aperture. The controller may further be configured to monitor (e.g., check) whether the driving state of the vehicle remains within the pre-stored fourth stage driving range and insert the second pin of the fastening pin separated from the third aperture when the driving state of the vehicle exceeds the fourth stage driving range.

The controller may be configured to adjust (e.g., control) the first pin and the second pin of the fastening pin inserted when the shift lever may be disposed at the select position in the fifth stage which is the high speed stage. The high speed stage may include the fifth stage and the sixth stage and the insertion aperture of the select lever part may further include a fifth aperture formed on the concentric circle having the same radius as the third aperture at the select position of the high speed stage. The controller may be configured to extract the second pin of the fastening pin inserted into the fifth aperture when the shift lever may engage the sixth stage and may be disposed at the select positions of the fifth stage and the sixth stage which are the high speed stage.

BRIEF DESCRIPTION OF THE DRAWINGS

The above and other features of the present disclosure will be apparent from the following detailed description taken in conjunction with the accompanying drawings.

DETAILED DESCRIPTION

Figure 1:
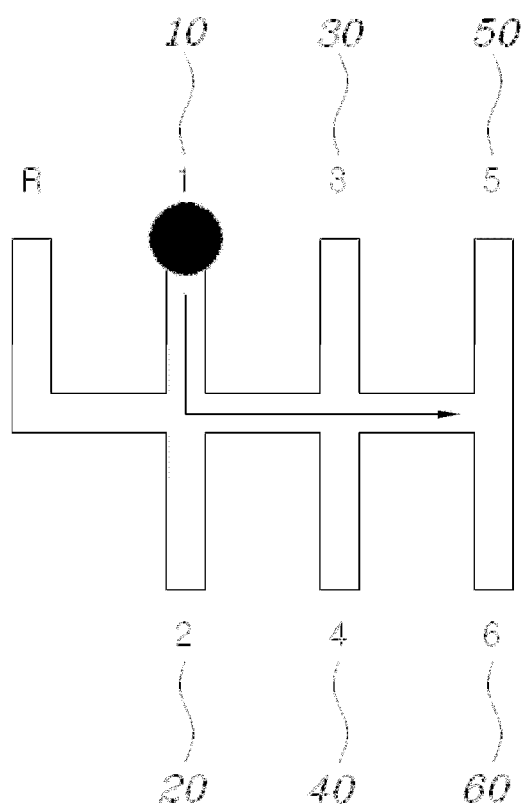
FIG. 1 is an exemplary diagram for describing the existing shifting operation mechanism according to the related art.

Advantages and features of the invention and methods of accomplishing the same may be understood more readily by reference to the following detailed descriptions of exemplary embodiments and the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
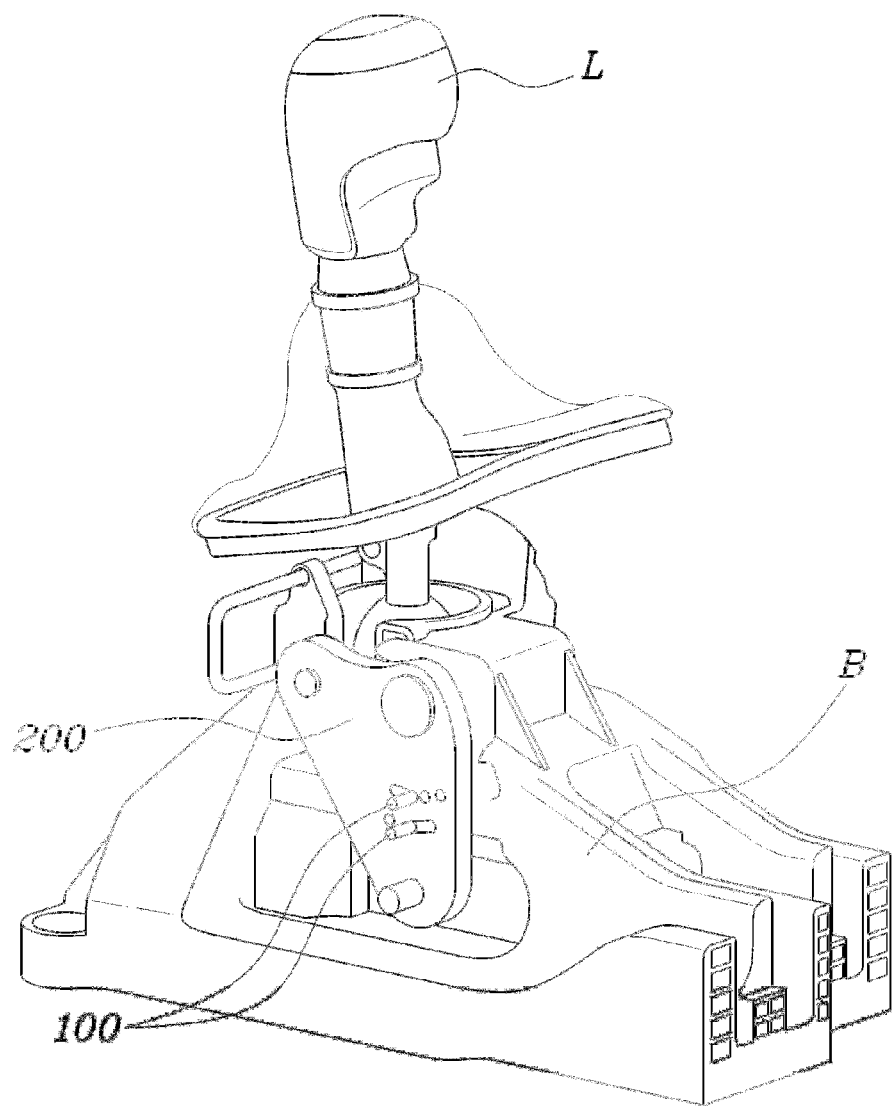
FIG. 2 is an exemplary view of a shift lever apparatus according to an exemplary embodiment of the present invention.
Figure 3:
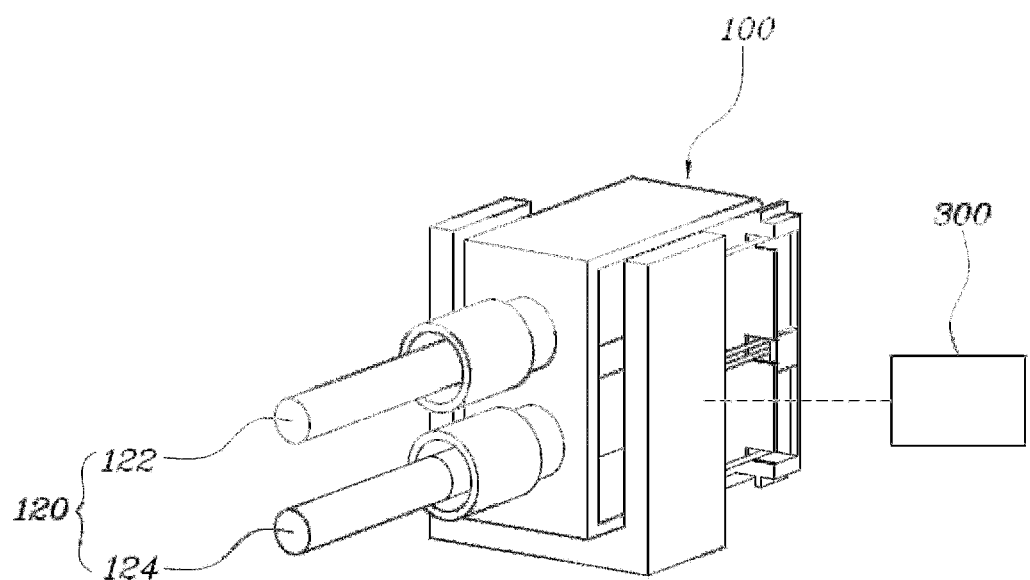
FIG. 3 is an exemplary diagram illustrating an operating part of the shift lever apparatus illustrated in FIG. 2 according to an exemplary embodiment of the present invention.
Figure 4:
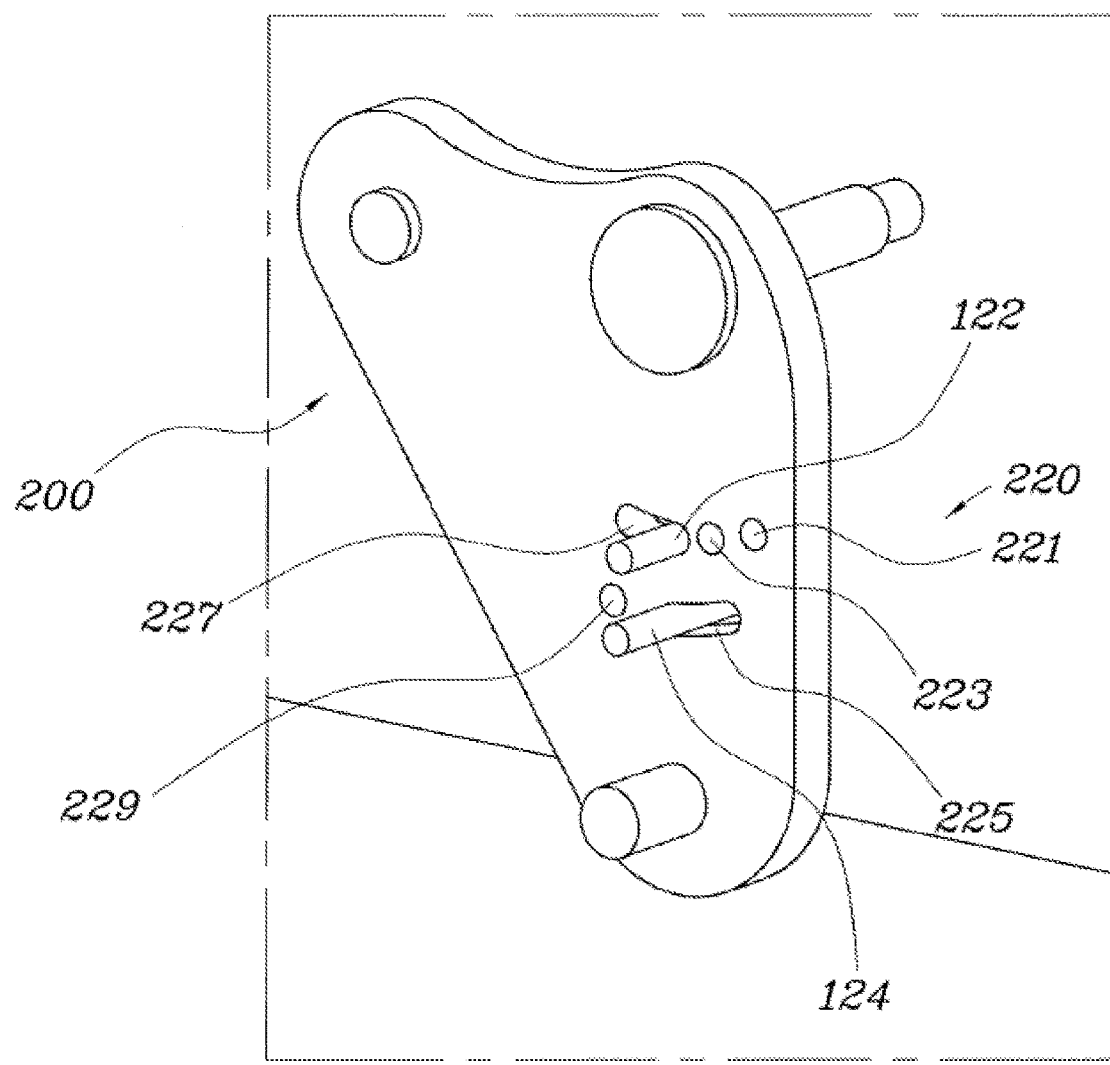
FIG. 4 is an exemplary diagram illustrating a select lever part of the shift lever apparatus illustrated in FIG. 2 according to an exemplary embodiment of the present invention.
Figure 5:
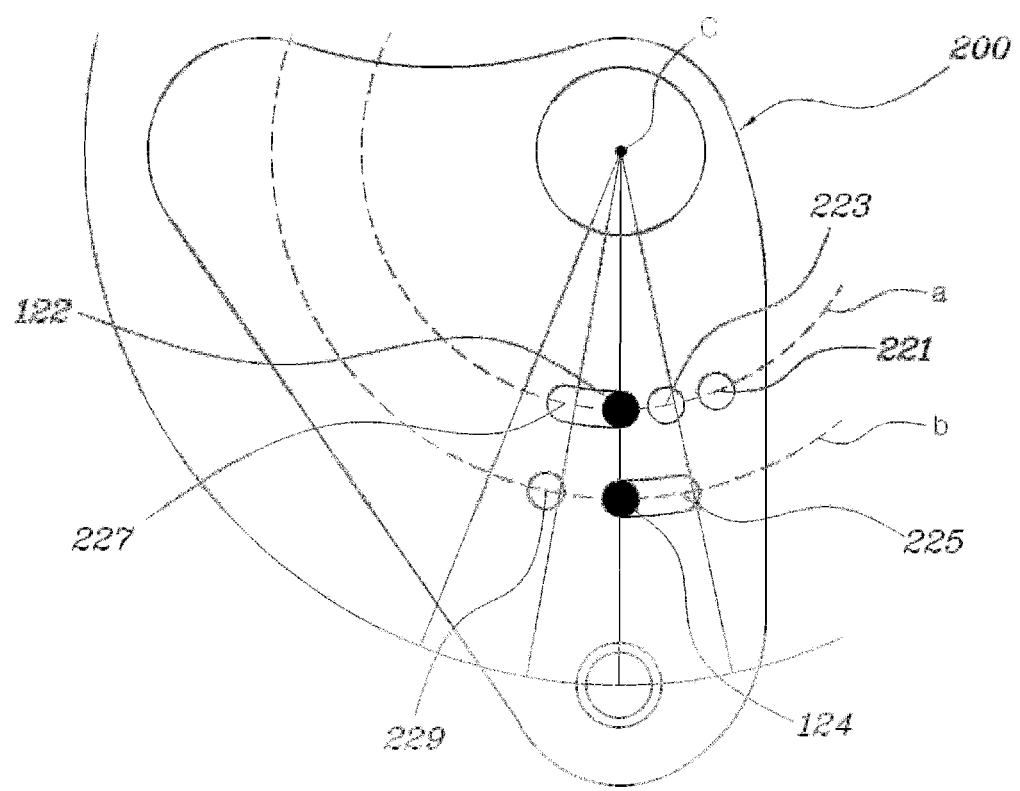
FIG. 5 is an exemplary diagram illustrating the select lever part illustrated in FIG. 4 according to an exemplary embodiment of the present invention.

FIG. 2 is an exemplary view of a shift lever apparatus according to an exemplary embodiment of the present invention, FIG. 3 is an exemplary diagram illustrating an operating part of the shift lever apparatus illustrated in FIG. 2, FIG. 4 is an exemplary diagram illustrating a select lever part of the shift lever apparatus illustrated in FIG. 2, and FIG. 5 is a diagram for illustrating the select lever part illustrated in FIG. 4. FIGS. 6 to 15 are exemplary diagrams for describing an operation of the shift lever apparatus according to the exemplary embodiment of the present invention.

As illustrated in FIGS. 2 and 3, the shift lever apparatus according to the exemplary embodiment may include an operating part 100 having fastening pins 120 extracted therefrom and inserted thereinto, based on a signal input. A select lever part 200 may be coupled to a shift lever L that may rotate based on a shift pattern along with the shift lever L and corresponds to a position of a shift stage based on the shift pattern. The select lever part 200 may include a plurality of insertion apertures 220 into which the fastening pins 120 may be inserted to selectively permit or limit the rotation of the shift lever L based on whether the fastening pins 120 are inserted into the plurality of insertion apertures 220. An expression of "the shift pattern" indicates a shift order of an R stage, and a first stage to sixth stages as shown in FIG. 1.

In this configuration, the operating part 100 may be fixedly installed in a base bracket B and may be configured of solenoids that fastening pins 120 are extracted or inserted based on whether an electric signal may be applied to the operating part 100 and may be configured to be adjusted by a controller 300 as described in detail below. In particular, the select lever part 200 may be coupled with the shift lever L and may rotate based on the shift pattern and rotates along with the shift lever L. The select lever part 200 may be rotatably installed within a base bracket B and may be coupled to a cable of the transmission to transfer a shifting operation based on the rotation of the shift lever L to the transmission. The select lever part 200 include the plurality of insertion apertures 220 into which the fastening pins 120 may be inserted to selectively limit the rotation based on whether the fastening pins 120 are inserted into the plurality of insertion apertures 220. As a result, the operation of the shift lever L may be permitted in the state when the fastening pins 120 are not inserted into the insertion apertures 220. The fastening pins 120 may be inserted into the insertion apertures 220, and the rotation of the select lever part 200 may be limited to limit the operation of the shift lever L.

As illustrated in FIG. 4, the insertion aperture 220 of the select lever part 200 may include a first aperture 221 formed to correspond to a select position of a reverse stage and a second aperture 223 formed to correspond to a select position of a low speed stage among advance stages. A third aperture 225 may be formed to correspond to a select position of an intermediate speed stage, and a fourth aperture 227 may be formed to correspond to a select position of a high speed stage. For example, the insertion aperture 220 formed in the select lever part 200 may include the first aperture 221, the second aperture 223, the third aperture 225, and the fourth aperture 227 that corresponds to each shift stage and forms the shift pattern. Further, each aperture may be formed by being divided into a low speed stage, a high speed stage, and a reverse stage.

In other words, the first aperture 222 may be formed to correspond to a select position of an R stage. The second aperture 223 may be formed to correspond to select positions of a first stage 10 and a second stage 20 that form the low speed stage. The third aperture 225 may be formed to correspond to select positions of a third stage 30 and a fourth stage 40 that form the intermediate speed stage. The fourth aperture 227 may be formed to correspond to select positions of a fifth stage 50 and a sixth stage 60 that form the high speed stage.

Moreover, the select position of the low speed stage and the select position of the intermediate speed stage or the select position of the intermediate speed stage and the select position of the high speed stage may be divided and the shifting may be performed more smoothly. For this purpose, as illustrated in FIG. 4, the third aperture 225 may extend to be coupled between the select position of the low speed stage and the select position of the intermediate speed stage. The fourth aperture 227 may extend to be coupled between the select position of the intermediate speed stage and the select position of the high speed stage. Accordingly, the third aperture 225 may be formed with a long aperture that extends to connect the select position of the low speed stage and the select position of the intermediate speed stage. The shift lever L may move (e.g., be displaced) from the low speed stage to the intermediate speed stage even though the fastening pin 120 may be inserted into the third aperture 225. The fourth aperture 227 may be formed with a long aperture extending between and coupled to the select position of the intermediate speed stage and the select position of the high speed stage, such that the shift lever L may move (e.g., be displaced) from the intermediate speed stage to the high speed stage even though the fastening pin 120 is inserted into the fourth aperture 227.

In other words, within the insertion aperture 220 of the select lever part 200 as described above, the first aperture 221 may be formed to correspond to the select position of the R stage, the second aperture 223 may be formed to correspond to the select positions of the first stage 10 and the second stage 20, the third aperture 225 may extend between and be coupled to the select positions of the first stage 10 and the second stage 20 and the select positions of the third stage 30 and the fourth stage 40, and the fourth aperture 227 may extend between and be coupled to the select positions of the third stage 30 and the fourth stage 40 and the select positions of the fifth stage 50 and the sixth stage 60. By this configuration, the shift lever may be moved from a position of a specific shift stage to another shift stage, the sequential shifting may depend on the shift stage and may be performed by extracting or inserting the fastening pin 120 by an instruction of the controller 300 to be described in detail below. The extraction or insertion control of the fastening pin 120 may be based on the rotation of the select lever part 200 during the operation of the shift lever L.

Furthermore, as illustrated in FIG. 5, the second aperture 223 and the fourth aperture 227 may be formed on a concentric circle a having the same radius based on a rotating center c of the select lever part 200. Further, the third aperture 225 may be formed on a concentric circle b having a different radius from a position at which the second aperture 223 and the fourth aperture 227 are formed. The first aperture 221 may be formed on either the concentric circle a on which the second aperture 223 and the fourth aperture 227 are positioned or the concentric circle b at a position at which the third aperture 225 is positioned.

Additionally, the second aperture 223, the fourth aperture 227, and the third aperture 225 may be formed on the concentric circles having different radii, to equally move the positions of the second aperture 223, the third aperture 225, and the fourth aperture 227 as the select lever part 200 rotates by rotating operation of the shift lever L. In particular, the third aperture 225 may extend to connect between the select position of the low speed stage and the select position of the intermediate speed stage and the fourth aperture 227 may extend to connect between the select position of the intermediate speed stage and the select position of the high speed stage. The third aperture 225 and the fourth aperture 227 may be formed on the concentric circle having different radii. The third aperture 225 and the fourth aperture 227 may be positioned to correspond to each other based on the select position of the intermediate speed stage. In this configuration, the shift lever L may move smoothly from the select position of the intermediate speed stage to the select position of the low speed stage or the select position of the high speed stage.

The first aperture 221 may be formed on either the concentric circle a on which the second aperture 223 and the fourth aperture 227 are formed or the concentric circle b where the third aperture 225 is formed, based on the shift pattern. In other words, when the shift lever L operates in an upward vertical direction based on the shift pattern to be shifted to the R stage, the first aperture 221 is formed on the concentric circle a on which the second aperture 223 and the fourth aperture 227 are formed. When the shift lever L operates in a downward vertical direction based on the shift pattern to be shifted to the R stage, the first aperture 221 is formed on the concentric circle b on which the third aperture 225 may be formed.

Further, as illustrated in FIG. 3, the fastening pin 120 of the operating part 100 may include the first pin 122 selectively inserted into the second aperture 223 and the fourth aperture 227 and the second pin 124 selectively inserted into the third aperture 225. As described above, the second aperture 223, the fourth aperture 227, and the third aperture 225 may be formed on the concentric circle having different (e.g., varying) radii. Additionally, the fastening pin 120 of the operating part 100 may be divided into the first pin 122 that may be inserted into the second aperture 223 and the fourth aperture 227 and the second pin 124 that may be inserted into the third aperture 225. Accordingly, the fastening pin 120 may be divided into the first pin 122 and the second pin 124 and may be sequentially inserted into or removed (e.g., separated) from the second aperture 223, the third aperture 225, and the fourth aperture 226, to sequentially displace the shift lever L may be sequentially displaced (e.g., move). For example, either the first pin 112 or the second pin 124 may be selectively inserted into the first aperture 221. As described above, the position of the first aperture 221 may be adjusted (e.g., set differently) based on the shift pattern, to allow the first pin 122 or the second pin 124 to be inserted based on the formation position of the first aperture 221.

Figure 6:
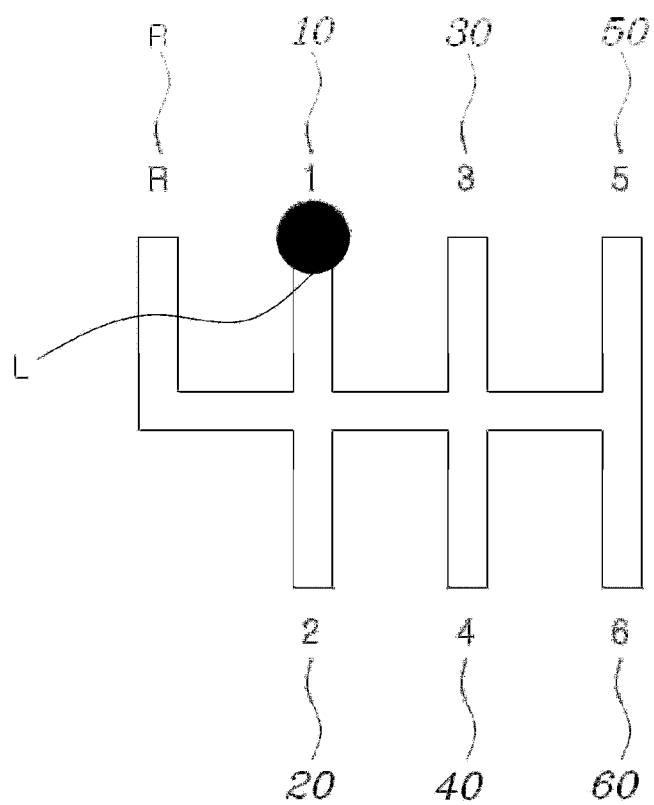
FIG. 6 is an exemplary diagrams for describing an operation of the shift lever apparatus according to the exemplary embodiment of the present invention.

Furthermore, the insertion aperture 220 disposed within the select lever part 200 may be formed to contact a shift stage based on the shift pattern. Additionally, the controller 300 may be configured to execute insertion or extraction of the fastening pin 120 of the operating part 100 to contact the movement of the shift lever, thereby performing the sequential shifting during the operation of the shift lever L. In particular, as illustrated in FIG. 6, as shown in an exemplary embodiment, the select position of the reverse stage may be separately positioned and the select positions of the first stage 10 and the second stage 20, the third stage 30 and the fourth stage 40, and the fifth stage 50 and the sixth stage 60 may be divided.

In other words, the exemplary embodiment may further include the controller 300 that may be configured to receive driving information of a vehicle and execute the extraction operation of the fastening pin 120. The controller 300 may be configured to execute the extraction operation of the fastening pin 120 based on driving conditions when the shift lever L rotates to be shifted to alternate (e.g., other) shift stages, thereby selectively permitting or limiting the rotation of the shift lever L. The driving information of the vehicle input to the controller 300 may be an engine revolutions per minute (e.g., RPM) of a vehicle and may be configured to execute the shift lever L receiving additional information related to a driving speed and an engine output.

Figure 7:
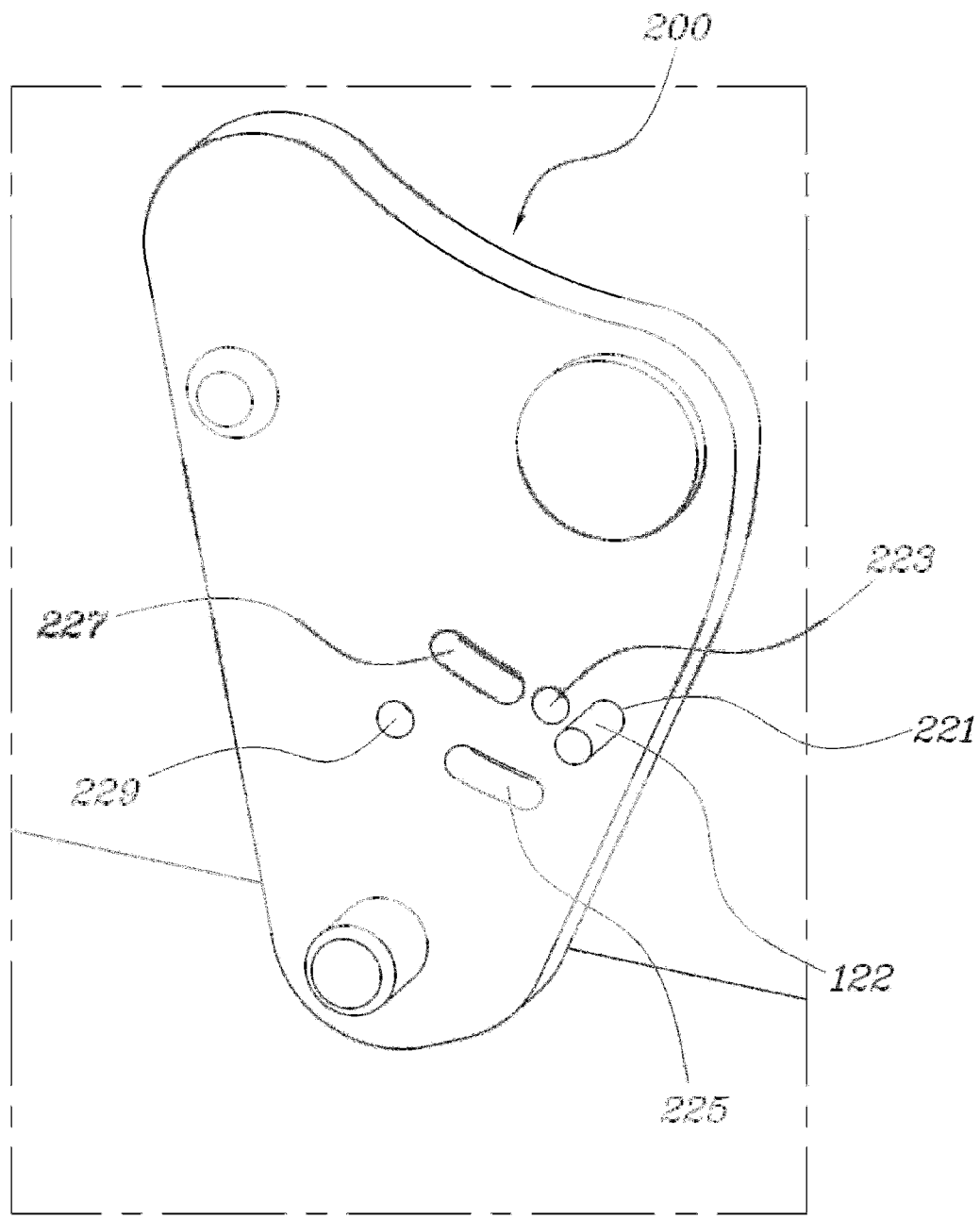
FIG. 7 is an exemplary diagram for describing an operation of the shift lever apparatus according to the exemplary embodiment of the present invention.

For example, the controller 300 may be configured to permit or limited the operating part 100 to rotate the select lever part 200. The controller 300 may be configured to extract the first pin 122 or the second pin 124 of the operating part 100 inserted into the first aperture 221 when the shift lever L is disposed in the R stage. In other words, when the shift lever L is positioned in the R stage, the vehicle may be driven reversely and the shifting to alternate shift stages (e.g., which are an advance stage) may be limited. As illustrated in FIG. 7, the controller 300 may be configured to extract the first pin 122 or the second pin 124 of the operating part 100 and may be inserted into the first aperture 221 to limit the rotation of the select lever part 200. Further, the rotation of the shift lever L may be limited, such that the shifting to alternate shift stages may not be performed when the shift lever engages the R stage.

Figure 8:
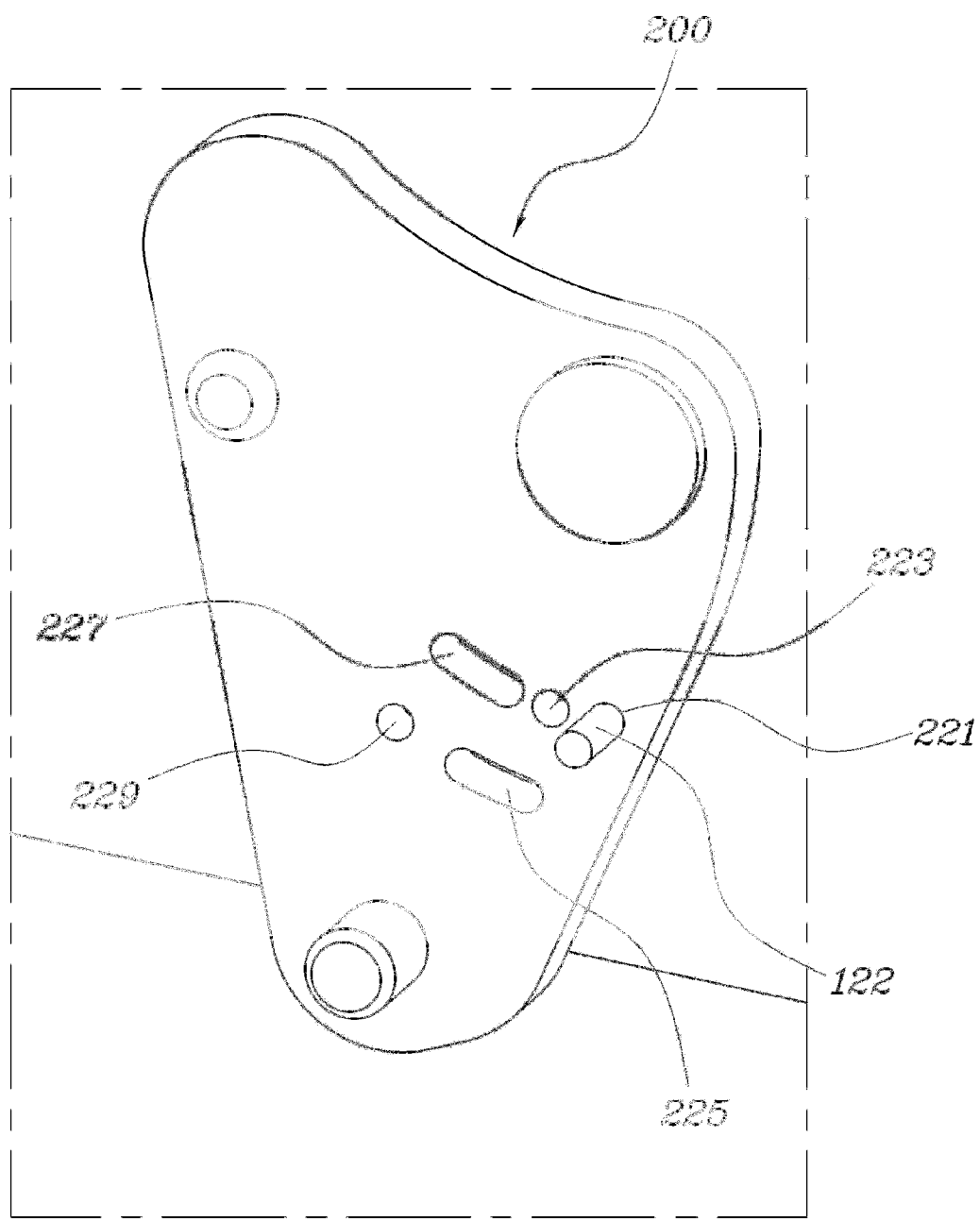
FIG. 8 is an exemplary diagram for describing an operation of the shift lever apparatus according to the exemplary embodiment of the present invention.

As illustrated in FIG. 8, the controller 300 may be configured to extract the first pin 122 of the fastening pin 120 to be inserted into the second aperture 223 when the shift lever L is shifted to the first stage 10 when positioned at the select positions of the first stage 10 and the second stage 20 which are the low speed stage. In other words, the controller 300 may be configured to extract the first pin 122 of the fastening pin to be inserted into the second aperture 223 when the shift lever translates (e.g., moves) to be disposed within the first stage 10 to limit the rotation of the select lever part 200, which may thereby limit the operation of the shift lever L to alternate shift stages. Accordingly, the shifting to the shift stage of the second stage 20 may be permitted when the shift lever L is shifted to the first stage, to include the sequential shifting may be induced.

Figure 9:
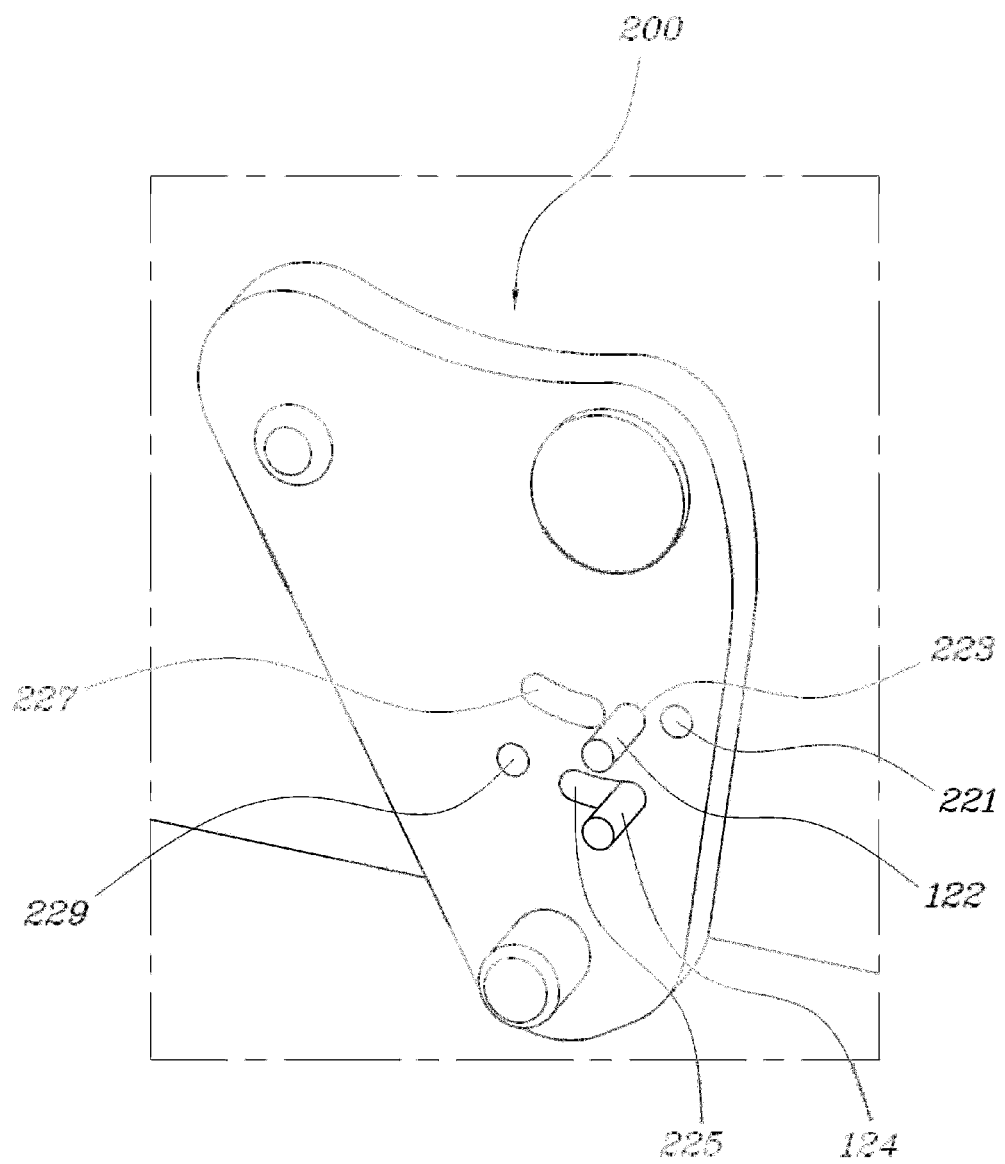
FIG. 9 is an exemplary diagram for describing an operation of the shift lever apparatus according to the exemplary embodiment of the present invention.

As illustrated in FIG. 9, the controller 300 may be configured to extract the second pin 124 of the fastening pin 120 inserted into the third aperture 225 when the shift lever L is disposed within the second stage 20. Further, the controller 300 may be configured to monitor the driving state of the vehicle to determine when the driving state falls within the pre-stored second stage driving range. In addition, when the driving state of the vehicle exceeds the second stage driving range the first pin 122 of the fastening pin 120 separated from the second aperture 223 may be extracted. In other words, when the shift lever L engages the second stage 20, the second pin 124 of the fastening pin may be extracted to be inserted into the third aperture 225. Accordingly, the shifting prepares to transition to the next shift stage which may be the third stage 30. In particular, to determine whether the driving state of the vehicle is shifted to the next shift stage, the driving state of the vehicle may compared with the pre-stored second stage driving range.

Figure 10:
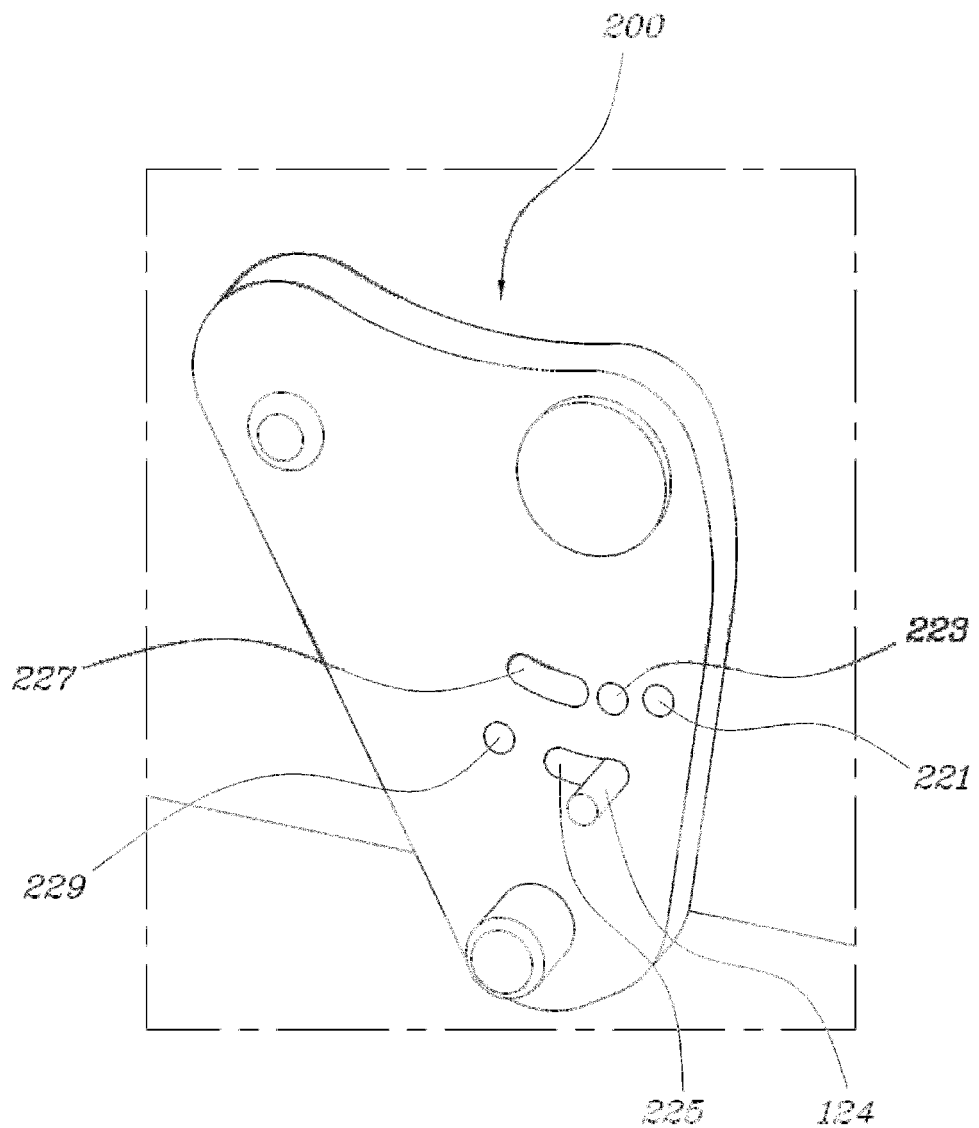
FIG. 10 is an exemplary diagram for describing an operation of the shift lever apparatus according to the exemplary embodiment of the present invention.

Therefore, the controller 300 may be configured to extract the second pin 124 of the fastening pin 120 inserted into the third aperture 225 when the driving state of the vehicle falls within the second stage driving stage. Accordingly, the state in which the first pin 122 is inserted into the second aperture 223 and the second pin 124 is inserted into the third aperture 225 may be maintained. For example, when the driving state of the vehicle exceeds the second stage driving range, as illustrated in FIG. 10, the first pin 122 of the fastening pin 120 may be separated from the second aperture 233 to move the shift lever L to the third stage 30.

However, the third aperture extends to be formed in a long aperture and may be coupled between the select positions of the first stage 10 and the second stage 20 which are the low speed stage and the select positions of the third stage 30 and the fourth stage 40. The shift lever L may be displaced (e.g., move, translate) from the select positions of the first stage 10 and the second stage 20 to the select positions of the third stage 30 and the fourth stage 40. Additionally, the shift lever L may be disposed (e.g., move, positioned etc.) to the select positions of the third stage 30 and the fourth stage 40 while being coupled to (e.g., locked, maintaining a fixed position) to the second pin 124 of the fastening pin 120, thereby preventing the excessive shifting to the high speed stages, the fifth stage 50 and the sixth stage 60.

Figure 11:
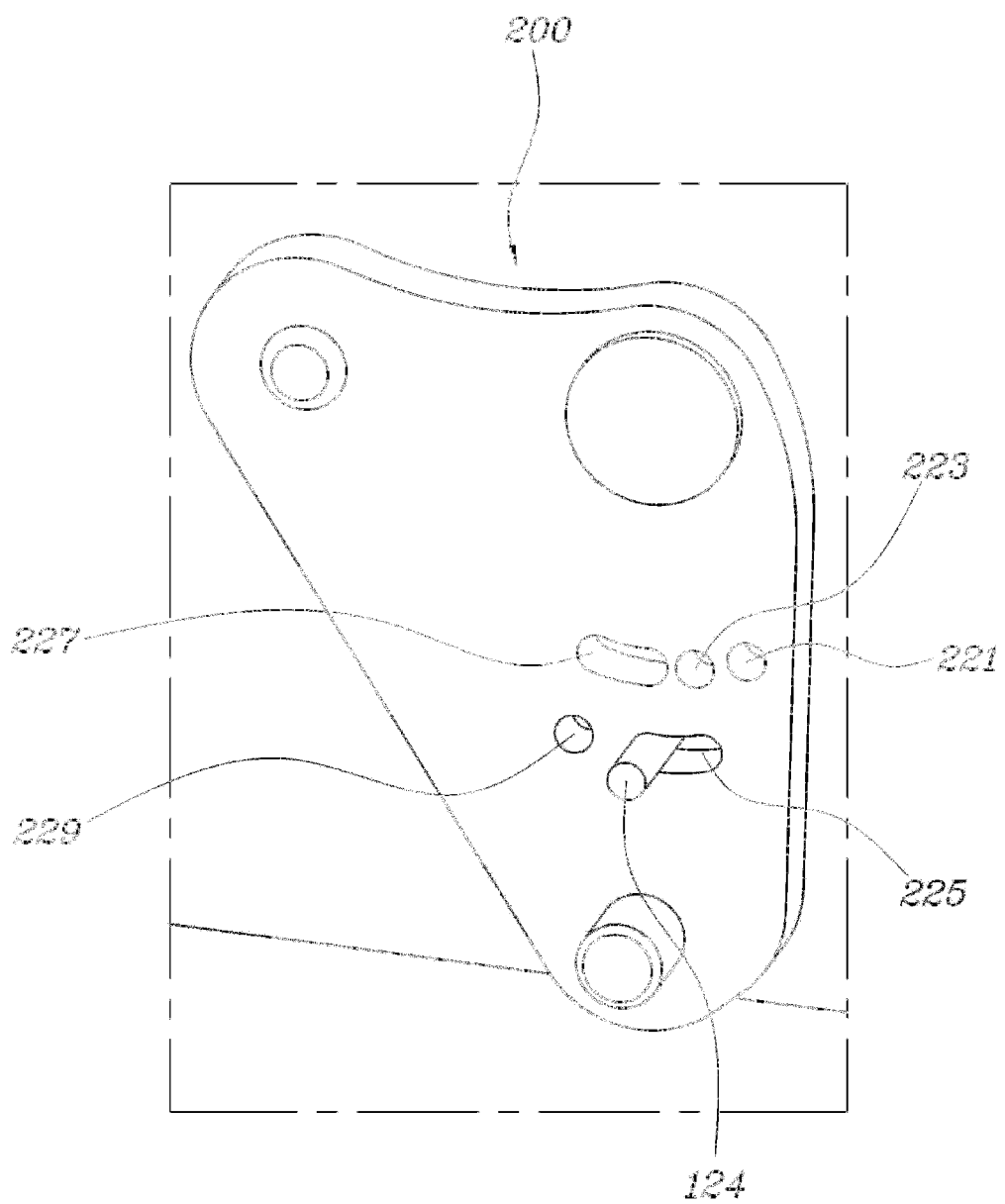
FIG. 11 is an exemplary diagram for describing an operation of the shift lever apparatus according to the exemplary embodiment of the present invention.

Moreover, the controller 300 may be configured to monitor whether the driving state of the vehicle falls within the pre-stored third stage driving range when the shift lever L engages the third stage 30 when the select positions of the third stage 30 and the fourth stage 40 are the intermediate speed stage. As illustrated in FIG. 11, the controller may be configured to extract the second pin 124 of the fastening pin 120 inserted into the third aperture 225 when the driving state of the vehicle does not satisfy the conditions required to engage the third stage driving range.

As the shifting from the select positions of the first stage 10 and the second stage 20 which are a previous shift stage to the select positions of the third stage 30 and the fourth stage 40 may be permitted, the second pin 124 of the fastening pin 120 may be inserted into the third aperture 225 and may be maintained. However, when the driving state of the vehicle does satisfy the pre-stored third stage driving range, the second pin 124 of the fastening pin 120 inserted within the third aperture 225 may be maintained to move the shift lever L to the previous shift stage.

The driving state of the vehicle may be disposed within the third stage driving range or may exceed the third stage driving range and the controller 300 may be configured to extract the first pin 122 of the fastening pin 120 inserted into the fourth aperture 227 or maintain the inserted state of the first pin 122. In other words, the first pin 122 may be inserted into the fourth aperture 227 when the second pin 124 of the fastening pin 120 inserted into the third aperture 225. The third aperture 225 and the fourth aperture 227 extend in different (e.g., alternate) directions based on the select positions of the intermediate speed stage and therefore at the select position of the intermediate speed stage, the second pin 124 may be inserted into the third aperture 225 and the first pin 122 may be inserted into the fourth aperture 227 to limit the rotation of the select lever part 200. Additionally, the movement of the shift lever L to the select position of the low speed stage or the select position of the high speed stage speed stage may be limited. However, the movement to the select position of the intermediate speed stage may remain uninhibited.

Particularly, when the driving state of the vehicle is within the third stage driving range, the first pin 122 of the fastening pin 12 may be inserted into the fourth aperture 227 so that the vehicle may be driven at the shift stage meeting the current vehicle driving condition. Accordingly, the movement of the shift lever L to the select position of the low speed stage or the select position of the high speed stage may be limited. Further, when the driving state of the vehicle exceeds the third stage driving range, the shifting to next shift stage, specifically the fourth stage 40 may be performed by moving the shift position of the shift lever L without a selection. However, the movement of the shift lever L to the select position of the low speed stage or the select position of the high speed stage may be limited, and thereby preventing the excessive shifting.

As shown in another exemplary embodiment, the shift lever L may be shifted to the fourth stage and in advance the second pin 124 may be inserted into the third aperture 225. Accordingly, the shifting to the high speed stages such as shift stages of the fifth stage 50 and the sixth stage may be limited. However, even though the vehicle may be driven while the shift lever engages the fourth stage, the inserted state of the first pin 122 may be maintained. The shifting to the first stage 10 or the second stage 20 may be performed based on the driving situation, thereby actively responding to the driving condition.

Figure 12:
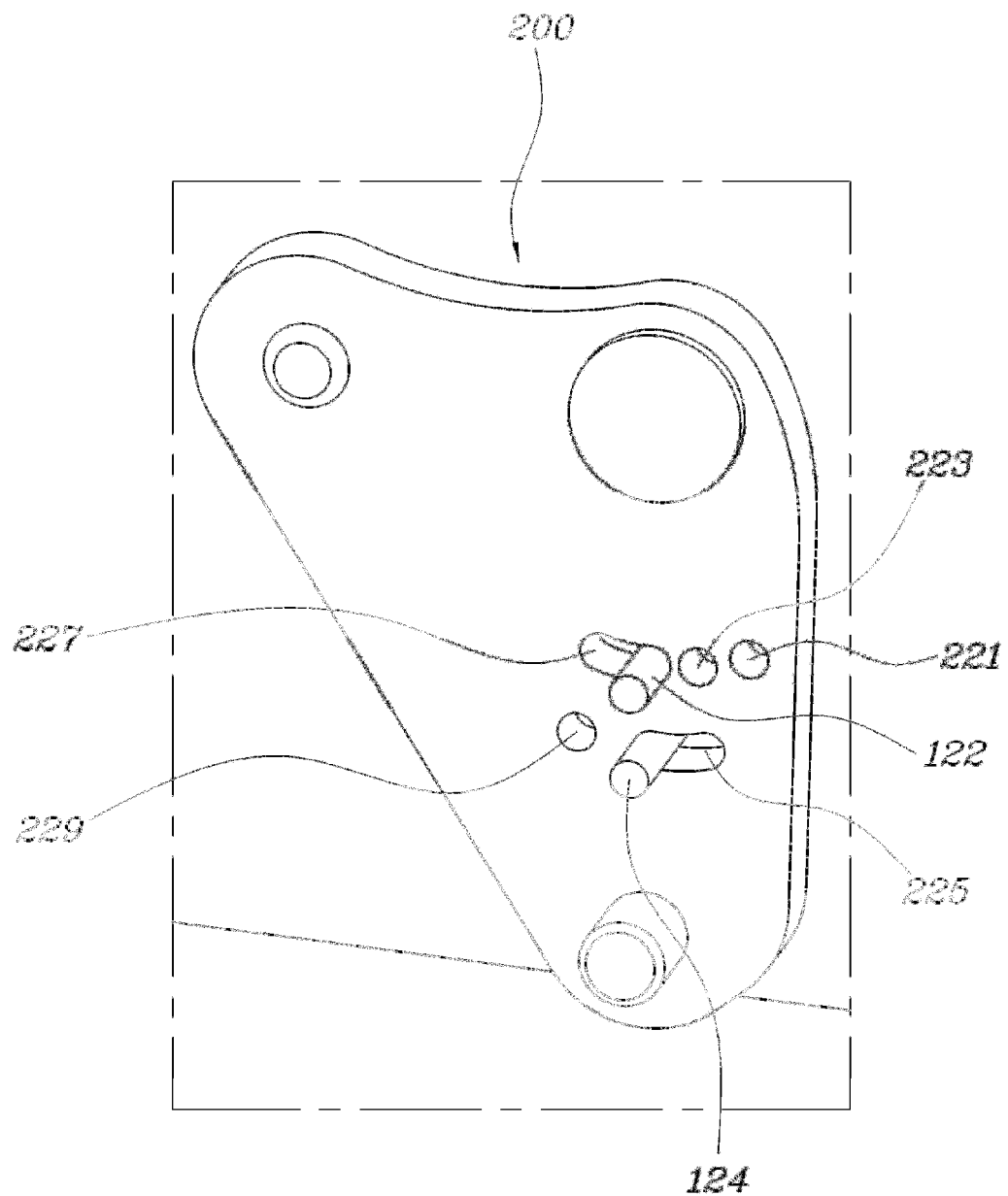
FIG. 12 is an exemplary diagram for describing an operation of the shift lever apparatus according to the exemplary embodiment of the present invention.

When the shift lever L is shifted (e.g., positioned within) to the fourth stage 40, as illustrated in FIG. 12, the controller 300 may be configured to insert the first pin 122 of the fastening pin 120 into the fourth aperture 227 and insert the second pin 124 into the third aperture 225. In addition, the controller may be configured to monitor whether the driving state of the vehicle falls within the pre-stored fourth stage driving range and insert the second pin 124 of the fastening pin 120 to be separated from the third aperture 225 when the driving state of the vehicle exceeds the fourth stage driving range. In other words, the first pin 122 of the fastening pin 120 may be inserted into the fourth aperture 227 and the second pin 124 may be inserted into the third aperture 225 when the shift lever L engages the fourth stage 40 to limit the rotation of the select lever part 200 and when the driving state of the vehicle exceeds the fourth stage driving range.

Figure 13:
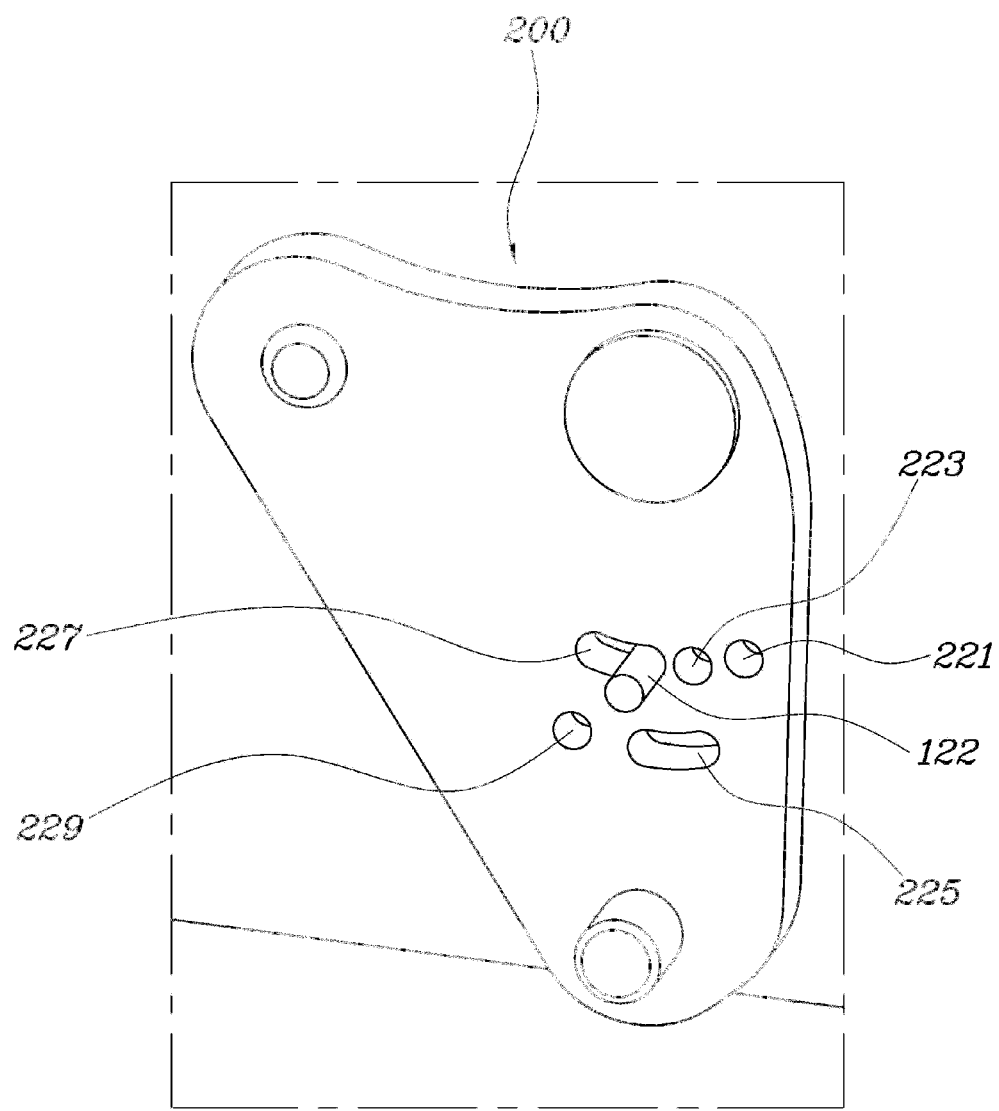
FIG. 13 is an exemplary diagram for describing an operation of the shift lever apparatus according to the exemplary embodiment of the present invention.
Figure 14:
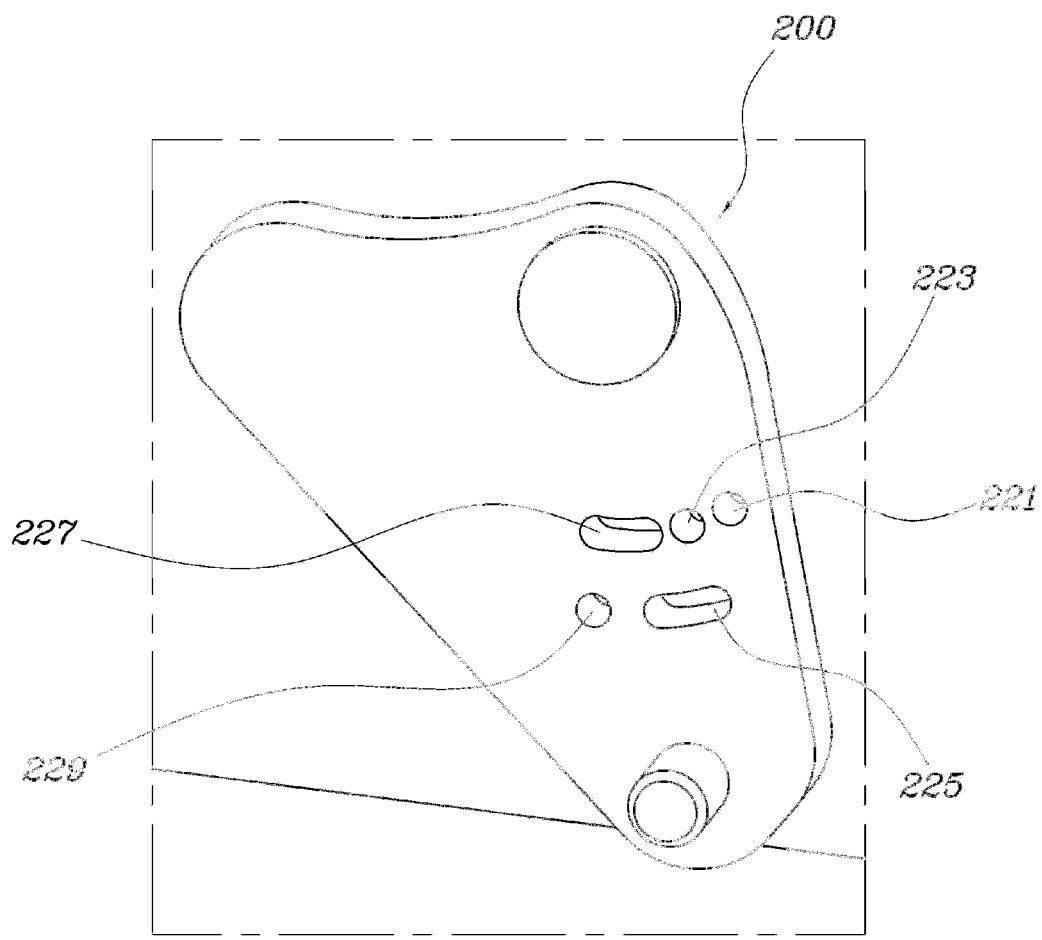
FIG. 14 is an exemplary diagram for describing an operation of the shift lever apparatus according to the exemplary embodiment of the present invention.

As illustrated in FIG. 13, the second pin 124 of the fastening pin 120 may be separated from the third aperture to move the shift lever may move to the fifth stage 50, which is the next shift stage.

However, the fourth aperture 227 may extend to be formed within a long aperture to be coupled (e.g., connect) between the select positions of the intermediate speed stage such as the third stage 30 and the fourth stage 40 and the high speed stage such as the select position of the fifth stage 50. The shift lever L may be operated to move from the select positions of the third stage 30 and the fourth stage 40 to the select position of the fifth stage 50. Accordingly, the first pin 122 of the fastening pin 120 may move to the select position of the fifth stage 50, and may thereby prevent the shift lever L from moving to the select position of the low speed stage due to the malfunction.

In an exemplary embodiment, the controller 300 may be configured to insert the first pin 122 and the second pin 124 of the fastening pin 82 when the shift lever L engages the fifth stage 50 and when the shift lever L engages the high speed stage at the select position of the fifth stage 50. For example, when the shift lever L engages to the fifth stage 50, the shift lever L may be positioned at the select position of the high speed stage in advance, and may thereby prevent an excessive shift operation. Therefore, the controller 300 may be configured to terminate the power supply applied to the operating part 100 to draw in the first pin 122 and the second pin 124 of the fastening pin 120, and may thereby prevent unnecessary power consumption.

Figure 15:
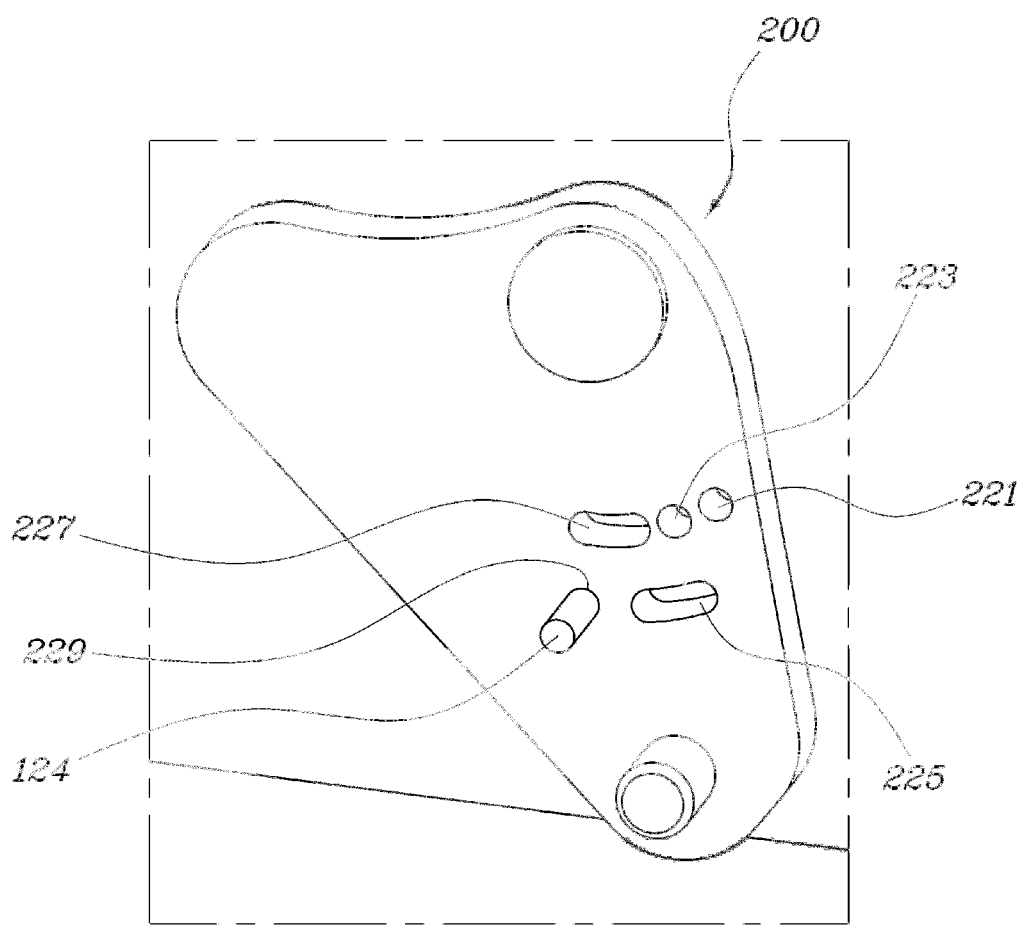
FIG. 15 is an exemplary diagram for describing an operation of the shift lever apparatus according to the exemplary embodiment of the present invention.

The high speed stage may include the fifth stage 50 and the sixth stage 60. The insertion aperture 220 of the select lever part 200 may further include a fifth aperture 229 formed on the concentric circle b having the about the same radius as the third aperture 225 at the select position of the high speed stage. Therefore, the controller 300 may be configured to extract the second pin 124 of the fastening pin 120 inserted into the fifth aperture 229 as illustrated in FIG. 15. The shift lever L engages to the sixth stage 60 during the high speed stage when and may position the shift lever L at the select positions of the fifth stage 50 and the sixth stage 60, thereby limiting the shifting from the sixth stage. The shift lever L apparatus may perform the same control functions by changing the position of the first aperture 221 for various shift patterns. Furthermore, the shift lever L apparatus may perform the sequential shifting by changing the detailed forming position of the insertion aperture 220 formed within the select lever part 200 based on the shift pattern and controlling the solenoid.

As described above, the present invention sequentially performs the shifting in consideration of the driving state of the vehicle at the time of the operation of the shift lever L. Accordingly, the driver may operate the shift stage more stably without improperly using the shift stage. In particular, an exemplary embodiment, prevents excessive shifting from the low speed stage to the high speed stage from starting off due to the shifting malfunction and prevents engine components from being damaged due to the overload of the transmission and the engine.

According to the shift lever apparatus having the above-mentioned structure, may prevention of starting off due to the shifting malfunction and may prevent engine components from being damaged due to the overload of the transmission and the engine. For example the shift lever apparatus may prevent excessive shifting from the low speed stage to the high speed stage within the manual transmission. Further, the driver may be able to stably operate the shift stage without erroneously operating the shift stage by sequentially performing the shifting operation.

Specific structural and functional descriptions will be provided only in order to describe various exemplary embodiments of the present invention disclosed in the present specification or disclosure. Therefore, exemplary embodiments of the present invention may be implemented in various forms, and the present invention is not to be interpreted as being limited to exemplary embodiments described in the present specification or disclosure.

Although the present invention has been shown and described with respect to what is presently considered to be exemplary embodiments, it is to be understood that the invention is not limited to the disclosed exemplary embodiments. On the contrary, it is intended to cover various modifications and equivalent arrangement without departing from the spirit and scope of as disclose din the accompanying claims.

What is claimed is:

1. A shift lever apparatus, comprising:
   an operating part having a fastening pin, wherein the fastening pin is extracted therefrom and inserted thereinto, based on a signal input; and
   a select lever part coupled to a shift lever that rotates based on a shift pattern to rotate along with the shift lever and to correspond to a position of a shift stage based on the shift pattern, wherein the select lever part includes a plurality of insertion apertures into which the fastening pin is inserted in order to selectively permit or limit the rotation of the shift lever based on whether the fastening pin is inserted into the plurality of insertion apertures,
   wherein the insertion apertures of the select lever part includes a first aperture formed to correspond to a select position of a reverse stage, a second aperture formed to correspond to a select position of a low speed stage among advance stages, a third aperture formed to correspond to a select position of an intermediate speed stage, and a fourth aperture formed to correspond to a select position of a high speed stage.

2. The shift lever apparatus of claim 1, wherein the third aperture extends to connect between the select position of the low speed stage and the select position of the intermediate speed stage and the fourth aperture extends to connect between the select position of the intermediate speed stage and the select position of the high speed stage.

3. The shift lever apparatus of claim 2, wherein the second aperture and the fourth aperture are formed on a first concentric circle having the same radius with each other from a rotating center of the select lever part, the third aperture is formed on a second concentric circle having a different radius from a position at which the second aperture and the fourth aperture are formed, and the first aperture is formed on either the first concentric circle on which the second aperture and the fourth aperture are positioned or the second concentric circle at a position at which the third aperture is positioned.

4. The shift lever apparatus of claim 1, wherein the first aperture is formed to correspond to a select position of a reverse stage,
   the second aperture is formed to correspond to select positions of a first stage and a second stage,
   the third aperture extends to connect between the select positions of the first stage and the second stage and select positions of a third stage and a fourth stage, and the fourth aperture extends to connect between the select positions of the third stage and the fourth stage and select positions of a fifth stage and a sixth stage.

5. The shift lever apparatus of claim 4, wherein the fastening pin of the operating part includes:
a first pin selectively inserted into the second aperture and the fourth aperture; and
a second pin selectively inserted into the third aperture, wherein either the first pin or the second pin is selectively inserted into the first aperture.

6. The shift lever apparatus of claim 5, further comprising:
a controller configured to receive driving information of a vehicle and executes the extraction operation of the fastening pin,
wherein the controller is configured to extract the fastening pin based on driving conditions when the shift lever rotates to be shifted to other shift stages to selectively permit or limit the rotation of the shift lever.

7. The shift lever apparatus of claim 6, wherein the controller is configured to extract the first pin or the second pin of the operating part inserted into the first aperture when the shift lever engages to the reverse stage when the shift lever is positioned at the select position of the reverse stage.

8. The shift lever apparatus of claim 6, wherein the controller is configured to extract the first pin of the fastening pin inserted into the second aperture when the shift lever engages to the first stage when positioned at the select positions of the first stage and the second stage.

9. The shift lever apparatus of claim 8, wherein the controller is configured to extract the second pin of the fastening pin inserted into the third aperture when the shift lever engages to the second stage and monitors whether the driving stage of the vehicle is within the pre-stored second stage driving range and insert the first pin of the fastening pin separated from the second aperture when the driving state of the vehicle exceeds the second stage driving range.

10. The shift lever apparatus of claim 6, wherein the controller is configured to monitor whether the driving state of the vehicle is within the pre-stored third stage driving range when the shift lever engages to the third stage when positioned at the select positions of the third stage and the fourth stage and extract the second pin of the fastening pin inserted into the third aperture when the driving state of the vehicle does not reach the third stage driving state.

11. The shift lever apparatus of claim 10, wherein when the driving state of the vehicle is within the third stage driving range or exceeds the third stage driving range, the controller is configured to extract the first pin of the fastening pin inserted into the fourth aperture or maintains the inserted state of the first pin.

12. The shift lever apparatus of claim 11, wherein when the shift lever engages the fourth stage, the controller is configured to insert the first pin of the fastening pin into the fourth aperture and insert the second pin into the third aperture and monitor whether the driving state of the vehicle is within the pre-stored fourth stage driving range and insert the second pin of the fastening pin separated from the third aperture when the driving state of the vehicle exceeds the fourth stage driving range.

13. The shift lever apparatus of claim 6, wherein the controller is configured to insert the first pin and the second pin of the fastening pin when the shift lever engages the fifth stage when the shift lever is positioned at the select position of the fifth stage.

14. The shift lever apparatus of claim 6, wherein the high speed stage includes the fifth stage and the sixth stage and the insertion aperture of the select lever part further includes a fifth aperture formed on the second concentric circle having the same radius as the third aperture at the select position of the high speed stage, and
the controller is configured to extract the second pin of the fastening pin to be inserted into the fifth aperture when the shift lever engages the sixth stage when positioned at the select positions of the fifth stage and the sixth stage which are the high speed stage.

* * * * *